US008192104B2

(12) United States Patent
Mann et al.

(10) Patent No.: US 8,192,104 B2
(45) Date of Patent: Jun. 5, 2012

(54) MACHINE SUSPENSION LINK PIN RETENTION SYSTEM

(75) Inventors: Brandon D. Mann, Decatur, IL (US); Thomas J. Gregg, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 455 days.

(21) Appl. No.: 12/392,540

(22) Filed: Feb. 25, 2009

(65) Prior Publication Data

US 2010/0215426 A1 Aug. 26, 2010

(51) Int. Cl.
*F16J 1/16* (2006.01)

(52) U.S. Cl. ......... 403/154; 403/152; 403/158; 403/319

(58) Field of Classification Search ............... 403/1, 14, 403/39, 62, 75, 79, 120, 150–154, 157–158, 403/161–163; 37/455–457; 414/482; 172/272; 280/124.1, 124.13, 124.116, 124.128, 124.156
See application file for complete search history.

(56) References Cited

U.S. PATENT DOCUMENTS

| 2,780,830 | A | * | 2/1957 | Kammerer, Jr. ................ 16/381 |
| 3,732,980 | A | * | 5/1973 | Evers et al. .................... 209/421 |
| 3,797,949 | A | | 3/1974 | Petros |
| 3,841,771 | A | * | 10/1974 | Shankwitz et al. ........... 403/163 |
| 3,936,203 | A | * | 2/1976 | Lowder et al. ................ 403/154 |
| 4,022,536 | A | * | 5/1977 | Piepho et al. .................... 403/16 |
| T985,006 | I4 | * | 8/1979 | Drochner ....................... 403/163 |
| 4,398,862 | A | * | 8/1983 | Schroeder ...................... 414/723 |
| 4,507,005 | A | * | 3/1985 | Siewert et al. .................. 403/16 |
| 4,652,167 | A | * | 3/1987 | Garman ......................... 403/158 |
| 4,772,150 | A | * | 9/1988 | Horton ............................. 403/39 |
| 5,044,812 | A | * | 9/1991 | Ardelt et al. ................... 403/154 |
| 5,290,119 | A | * | 3/1994 | Kallenberger et al. ....... 403/315 |
| 5,630,673 | A | * | 5/1997 | Krzywanos et al. .......... 403/158 |
| 5,961,141 | A | * | 10/1999 | Goel .............................. 280/515 |
| 6,135,469 | A | * | 10/2000 | Hulstein et al. .............. 280/86.5 |
| 6,158,917 | A | * | 12/2000 | Wolin et al. .................... 403/319 |
| 6,273,632 | B1 | * | 8/2001 | Takahashi et al. ............ 403/154 |
| 6,599,052 | B1 | * | 7/2003 | Phillips ......................... 403/367 |
| 7,309,186 | B2 | * | 12/2007 | Oertley ......................... 403/288 |
| 7,329,066 | B2 | * | 2/2008 | Pineiros et al. ............... 403/353 |
| 2004/0228676 | A1 | * | 11/2004 | Oertley ......................... 403/154 |

FOREIGN PATENT DOCUMENTS

| EP | 0982506 | 10/2004 |
| JP | 07172125 | 12/1993 |

* cited by examiner

*Primary Examiner* — Daniel Stodola
*Assistant Examiner* — Jonathan Masinick
(74) *Attorney, Agent, or Firm* — Finnegan, Henderson, Farabow, Garrett & Dunner LLP; Michael D. Braunstein (57) ABSTRACT

A pin joint assembly for pivotally connecting a plurality of components, the assembly including a joint pin with a channel at one end disposed transverse to a longitudinal axis of the pin and a first retainer disposed in the slot that extends beyond a circumference of the pin to restrict axial movement in a first direction, while a second retainer is positioned over the first retainer to restrict axial movement in the opposite axial direction, a retainer base having a slot being configured to receive one end of the first retainer to restrict rotational movement of the first retainer and attached joint pin. The joint pin and pin joint assembly may be provided as part of a suspension assembly for machine axles, the pin joint assemblies providing pivotal connections between an axle assembly, linkage and frame members.

21 Claims, 6 Drawing Sheets

MACHINE SUSPENSION LINK PIN RETENTION SYSTEM

TECHNICAL FIELD

This disclosure relates generally to the art of on and off-highway mobile machinery, and more particularly to the pin joints used in connection with suspensions for axle assemblies of on and off-highway machinery.

BACKGROUND

In conventional off-highway machines, it is generally known to connect two or more structural components through a pivotal pin joint. The pins are typically secured, thereby restricting axial movement, using various mechanisms, such as, plates bolted on one end of the joint pin, cotter pins inserted into a hole drilled at one end of the joint pin, collars welded to the joint pin, and the like.

One application of such pin joints is in connection with the axle suspension assemblies of off-highway machinery, particularly in connection with off-highway haul trucks. These trucks typically include a rear axle assembly that is pivotally connected to the machine frame via one or more linkages, with pin joints connecting the linkages to one or both of the frame and axle assembly.

Due to the environment in which such machines are operated, for example, in mining, quarry or construction operations, and the sheer size of the components, repair and replacement of such pins and associated components can prove difficult and time consuming. Conventional pin joints on the axle assemblies typically require a large amount of force to be removed and specialized tooling. Such tooling is typically too large to be employed in the field, and may require additional components to be removed from the machine to allow for access to the pins. In particular, poor accessibility for repair or removal of the pin joints can significantly increase machine downtime, operating and maintenance costs.

The present disclosure is directed to one or more of the problems set forth above.

SUMMARY OF THE INVENTION

In one aspect, disclosed is a pin joint assembly for pivotally connecting two or more machine components. The assembly generally includes a joint pin having first and second ends, a central longitudinal axis, and a channel disposed transverse to the longitudinal axis on at least one end of the pin. A first retainer including a first and second end is disposed within the channel and removably connected to the joint pin. One of the ends of the retainer extends beyond the circumference of the joint pin to restrict axial movement of the joint pin in a first direction. A second retainer is positioned over the first retainer to restrict movement of the joint pin in a second axial direction. The assembly may also include a retainer base that includes a slot configured to receive an end of the first retainer, restricting rotational movement of the first retainer and attached joint pin.

In another aspect, provided is a pin joint assembly that includes a first component and second component having aligned bores with a joint pin inserted therein to allow for pivotal movement between the components. The joint pin includes first and second ends, a central longitudinal axis, and a channel disposed transverse to the longitudinal axis on a first end of the pin. A first retainer including a first and second end is disposed within the channel and removably connected to the joint pin. One of the ends of the retainer extends beyond the circumference of the joint pin to engage the first component and restrict axial movement of the joint pin in a first direction. A second retainer is positioned over the first retainer to restrict movement of the joint pin in a second axial direction. The assembly may also include a retainer base connected to the first component that includes a slot configured to receive an end of the first retainer, restricting rotational movement of the first retainer and attached joint pin.

In yet another aspect, provided is a joint pin for use in connection with such assemblies, the joint pin having an outer cylindrical surface, a central longitudinal axis, and a transverse axis. The joint pin also has a rectangular channel disposed along the transverse axis on the first end of the pin, the channel defined by a first wall, second wall, and a channel bottom surface. A plurality of threaded bores are spaced along the transverse axis on the bottom surface, the threaded bores having a first diameter. A threaded first puller bore having a diameter larger than that of the other threaded bores is disposed along the central longitudinal axis of the pin, while a second puller bore is disposed on the other side of the joint pin.

In yet another aspect, disclosed is an axle suspension system that includes a frame, an axle assembly, and a plurality of linkage bars that connect the axle assembly to the frame via pivotal connections that include the disclosed pin joint assemblies. The assemblies include a joint pin having first and second ends, a central longitudinal axis, and a channel disposed transverse to the longitudinal axis on at least one end of the pin. A first retainer including a first and second end is disposed within the channel and removably connected to the joint pin. One of the ends of the retainer extends beyond the circumference of the joint pin to restrict axial movement of the joint pin in a first direction. A second retainer is positioned over the first retainer to restrict movement of the joint pin in a second axial direction. A retainer base is provided with a slot configured to receive an end of the first retainer, restricting rotational movement of the first retainer and attached joint pin.

These and other aspects and advantages of the present disclosure will become apparent to those skilled in the art upon reading the following detailed description in connection with drawings and the appended claims.

DETAILED DESCRIPTION

Figure 1:
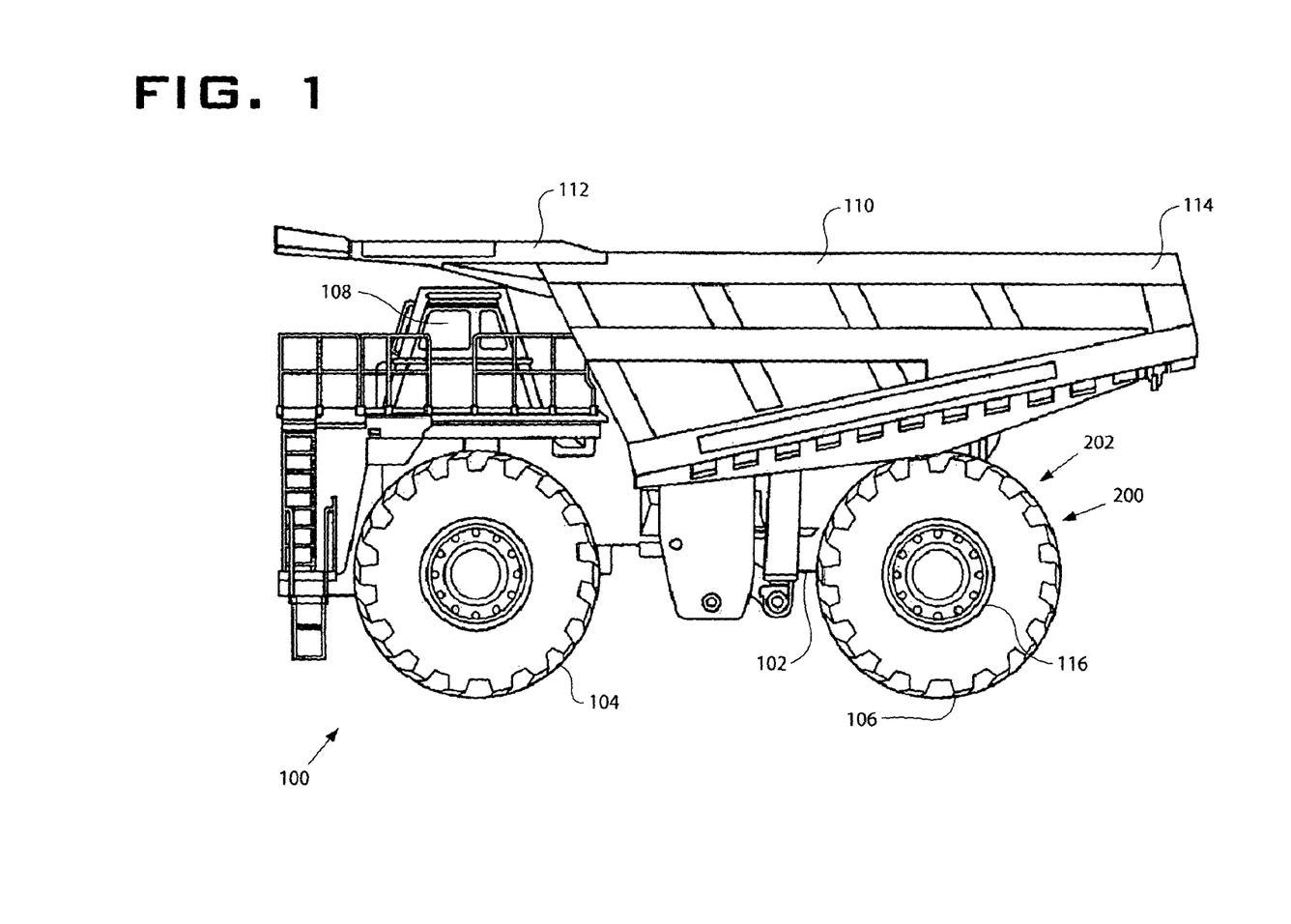
FIG. 1 is a side view of an off-highway truck in accordance with one embodiment of the disclosure.

An exemplary embodiment of a mobile machine 100 is shown generally in FIG. 1. The machine 100 may be an off-highway truck, as shown, or any other off-highway or on-highway vehicle. Off-highway truck 100 generally includes a frame 102 that supports a propulsion system for driving one or more wheels 104, 106 of the machine, such as, for example, rear wheels 106. The frame may also support a platform positioned at a front end of the machine 100 having an operator control station 108 mounted thereon. A dump body 110 may be pivotally mounted on the frame such that the dump body 110 is movable between the shown hauling position and a dumping position in which a front portion 112 of the body is elevated relative to a rear portion 114 thereof.

In on and off-highway machinery, two or more structural components may be connected through a pin joint to permit pivotal movement. In one embodiment, for example, shown in FIGS. 2-3, a rear axle assembly 200 is connected to a portion of frame 102 of truck 100 through an axle suspension assembly 202. The axle suspension assembly 202 includes one or more linkages 204a-b, pin joints 206a-d being employed to connect the linkages 204a-b to one or both of the rear axle assembly 200 and frame 102. The linkages 204a-b and pin joints 204a-d allow relative movement between the axle assembly 200 and the frame 102.

The rear axle assembly 200 includes an axle housing 212 that extends between the opposing rear wheels 106 of the machine 100. The axle housing 212 may contain, for example, a rear differential, one or more axle shafts, lubrication and cooling structures, brake components, reduction drives, and the like (elements not shown). In the case of electrically driven machines, the axle housing 212 may also contain one or more electric motors (not shown). In one embodiment, disposed on each side of the machine 100 are final drives 214 accessed via cover plates 216. Rim mounting flanges 218 are provided for connection to the rear wheel rims 116 (FIG. 1). Also provided are upper 208 and lower mounts 210, devises that may be cast or connected to the external surface of the rear axle housing 212. The upper and lower mounts 208, 210 are structured for pivotal connection to linkage bars 204 that connect the axle housing 212 to the frame 102.

Figure 3:
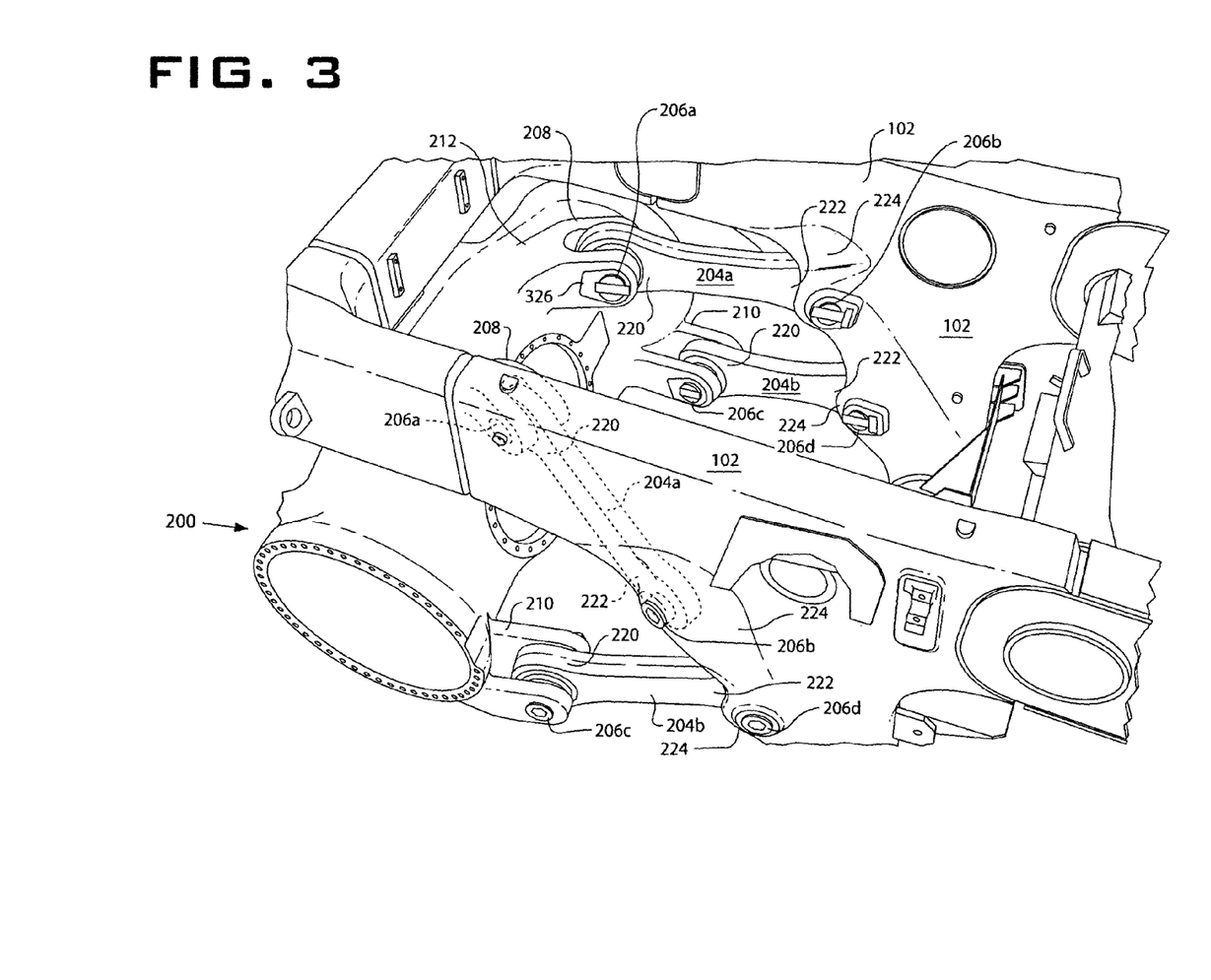
FIG. 3 is a perspective view of the four bar axle suspension assembly of FIG. 2.

In one embodiment, FIG. 3, the axle suspension assembly 202 consists of a four-bar linkage including right and left side upper and lower linkage bars 204a,b disposed on each side of the axle assembly 200. The linkage bars 204a,b include a first end 220 and a second end 222, the first ends 220 being pivotally connected to the axle housing 212 via pin joints 206a,c at upper and lower mounts 208, 210, respectively. The second ends 222 may be pivotally connected to the frame 102 via pin joints 206b,d at mounting portions 224 of frame 102.

Figure 2:
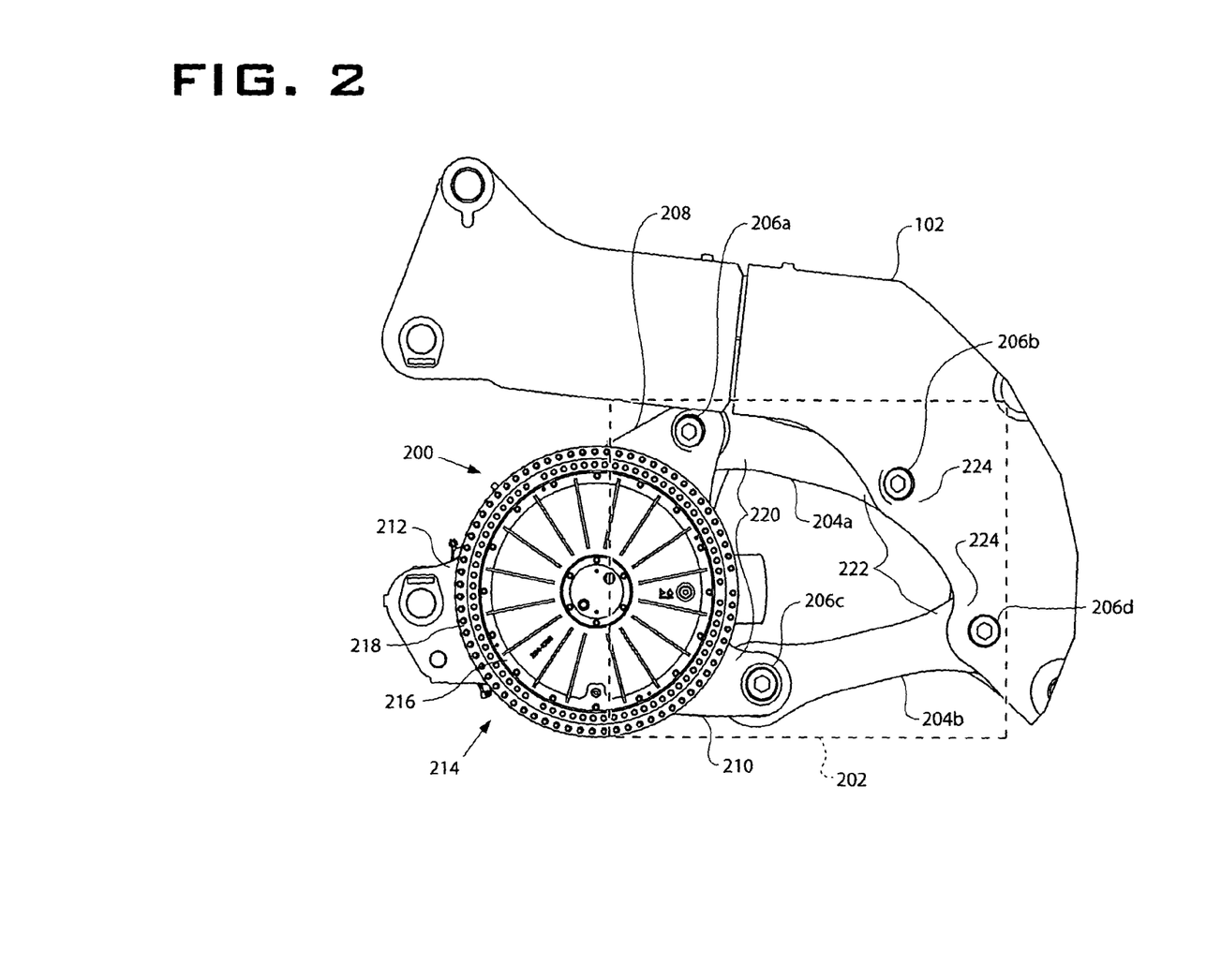
FIG. 2 is a side view of an axle suspension assembly in accordance with one embodiment of the present disclosure.
Figure 4:
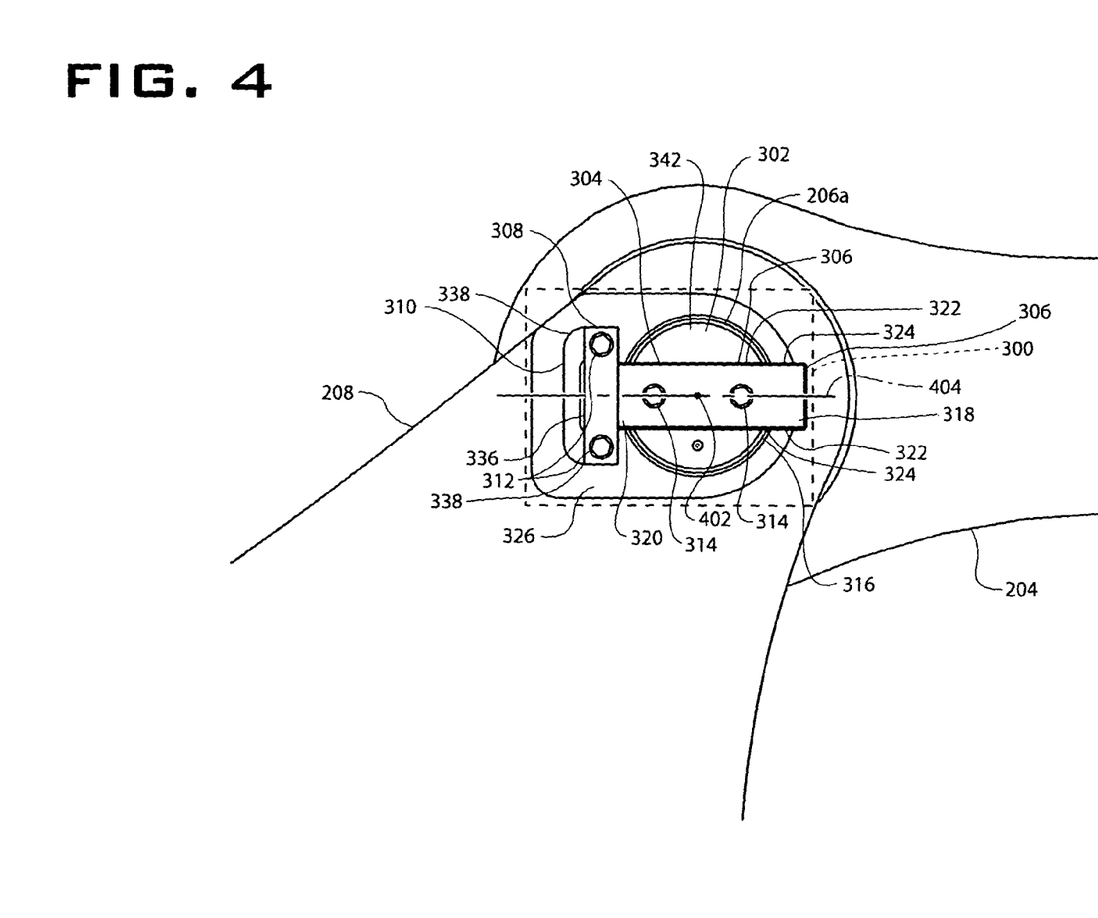
FIG. 4 illustrates a pin joint assembly in accordance with one embodiment of the present disclosure.
Figure 5:
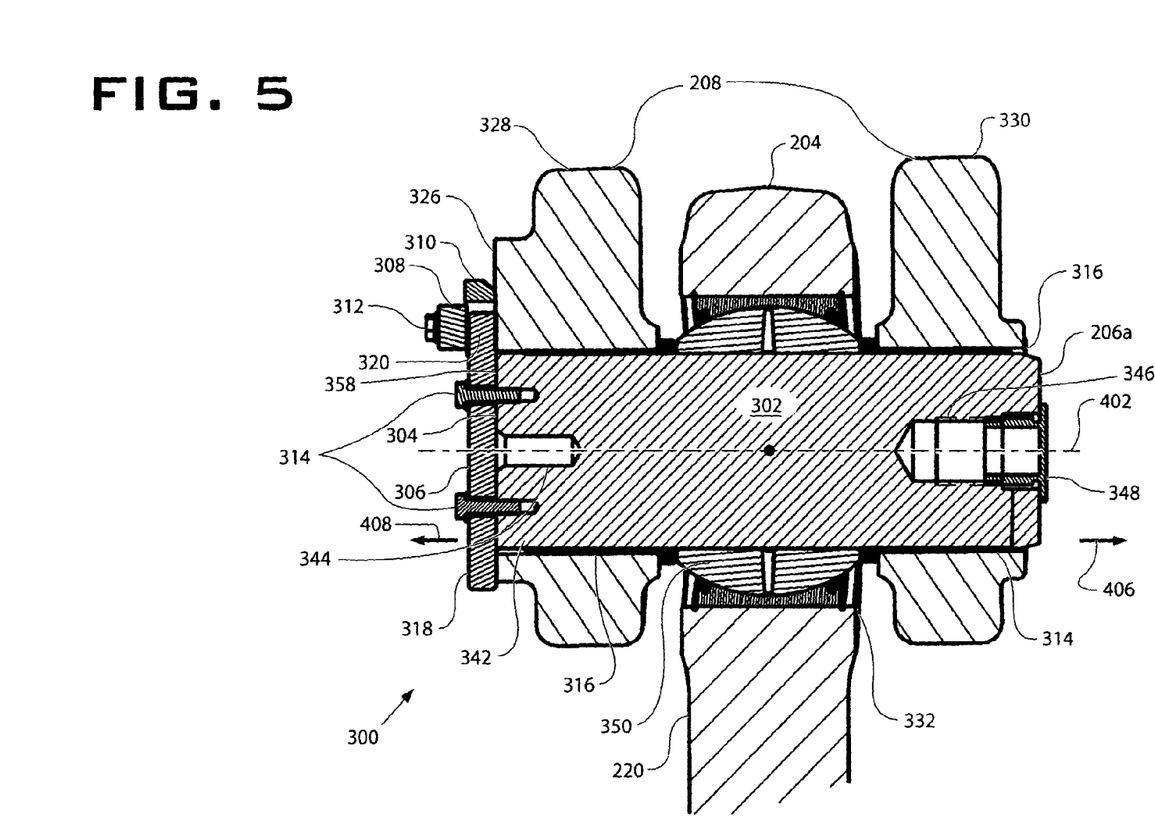
FIG. 5 is a cross sectional view of the pin joint assembly of FIG. 3.
Figure 6:
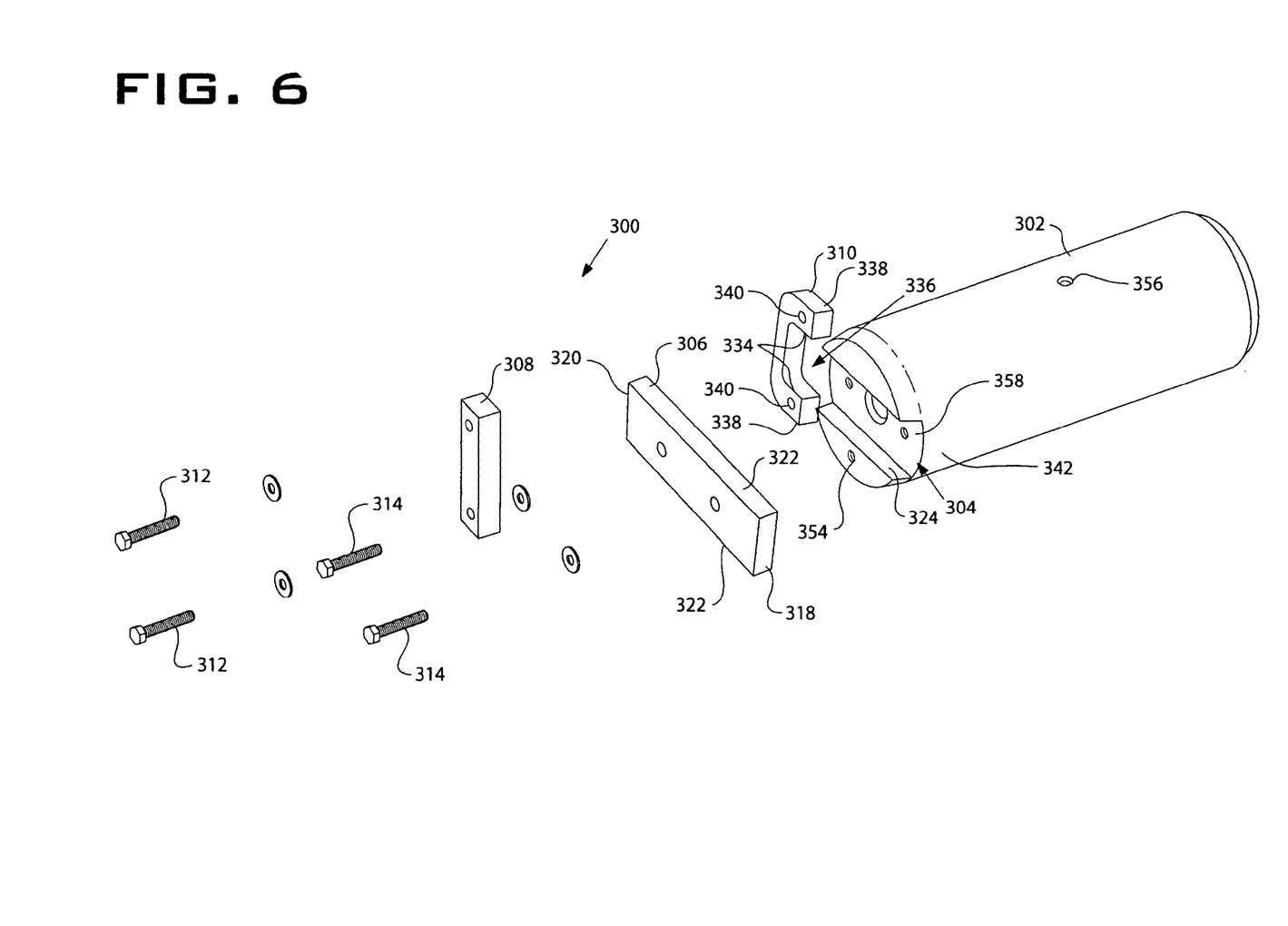
FIG. 6 is an exploded view of a pin joint assembly in accordance with one embodiment of the present disclosure.

FIGS. 4-6 illustrate an exemplary pin joint assembly 300, FIGS. 4-5 providing an enlarged view of the pin joint 206a, connecting upper mount 208 to upper linkage 204a in FIG. 2. Pin joint assembly 300 generally includes joint pin 302, a channel 304, a first retainer 306, a second retainer 308, a retainer base 310, and fasteners 312,314. Pin joint assembly 300 allows relative rotation of a first component, for example, axle assembly upper mount 208; and a second component, for example, upper linkage bar 204a about central longitudinal axis 402. FIG. 3 also shows a bore 316 for receiving joint pin 302 and a machined surface 326 on mount 208 for attaching retainer base 310.

In one embodiment, pin 302 has a channel 304 on a first end 320 thereof. The channel 304 may be disposed perpendicular to a central longitudinal axis 402 of the pin 302, and has a generally rectangular cross section, defined by inner walls 324 and bottom surface 358, configured for engagement between side surfaces 322 of first retainer 306 and inner walls 324 of the channel. This orientation prohibits both axial and rotational movement of the pin when the pin joint assembly 300 is fully assembled.

In the embodiment shown, first retainer 306 is an elongated, rectangular plate that is configured to fittingly engage the rectangular channel 304. However, alternative designs may be employed wherein, for example, the sides of the first retainer 306 are tapered inward in a trapezoidal or triangular cross-section with a corresponding channel 304. Moreover, it is contemplated that more than one first retainer 306 may be provided, or that the first retainer 306 may have an alternative shape, such as a cross-like configuration. Numerous alternatives should be readily appreciated by one of skill in the art based on this disclosure, provided that the structure can withstand the axial and rotational forces of the specific application.

Moreover, in another potential embodiment (not shown), pin 302 may have, in place of channel 304, one or more protuberances that extend outward and engage one or more mating channels or openings in a first retainer 306.

Generally, first retainer 306 has a first end 318 and a second end 320. In one embodiment both the first and second ends 318, 320 extend outward beyond the circumference of pin 302 and the ends of channel 304. First retainer 306 is fastened to joint pin 302 through one or more fasteners, such as bolts 314. Thus fastened, the ends 318,320 abut machined surface 326 and restrict axial movement of joint pin 302 through bore 316 in first axial direction 406. In one embodiment, shown, one or more fasteners 314 are disposed along transverse axis 404. More than one fastener 314 may be provided so as to restrict rotational movement of the joint pin 302 when the first retainer 306 is secured.

While the first retainer 306 restricts axial movement in a first axial direction 406 (FIG. 5), it may also be necessary to restrict axial movement in a second direction 408 and/or rotational movement of the pin. In one embodiment, a retainer base 310 is provided that is connected to the first component, for example, upper mount 208. The retainer base 310 will generally include one or more surfaces 334 that act as stops to rotational movement of first retainer 306. In the embodiment shown in FIGS. 4-6, for example, the retainer base 310 is U-shaped, having leg portions 338 defining a central slot 336 configured to receive second end 320 of first retainer 306. The retainer base 310 may be, for example, cast, welded, bolted or otherwise affixed to the underlying component to provide a solid stop to rotational movement of first retainer 306, and the joint pin 302 to which it is attached.

The retainer base 310 may be, for example, welded to a portion of the underlying component (e.g., upper mount 208) on a machined level surface 326. The machined surface 326 also provides a mating surface for the engaging ends 318,320 of the first retainer 306.

The leg portions 338 may include one or more bolt holes 340 configured to receive fasteners 312 for removable attachment of a second retainer 308. The second retainer 308 is positioned over the second end 320 of the first retainer 306 to secure the first retainer 306 and attached pin 302. So attached, the second retainer 308 prevents axial movement of the pin 302 in a second axial direction 408 (FIG. 5). It will be appreciated that rotation of the joint pin 302 about axis 402 is thereby restricted without any shear force being applied to fasteners 312 (if there was no retainer base 310). In an alternative embodiment (not shown), however, the retainer base 310 and second retainer 308 could be provided as a single unit, for example, cast as a single unit, the retainer base 310 being removably connected to the underlying component (e.g., upper mount 208) via one or more fasteners.

Referring to FIG. 5, which is a cross sectional view of an exemplary pin joint assembly 300, the first connecting member (upper mount 208) is shown in the form of a clevis having first and second extensions 328,330 that surround centrally disposed linkage 204. A spherical plane bearing 350 is disposed about pin 302 that allows for rotational and tilting movement of the linkage 204 within the clevis of mount 208. While the embodiments shown include a clevis associated with the mounting portions 224 of frame 102 and upper and lower mounts 208, 210, alternative arrangements, such as where the linkages 204 have a clevis that engage a protrusions on the frame 102 or axle housing 212, may also be employed.

The embodiments shown in FIGS. 2-6 illustrate a pin joint assembly 300 that includes retainers 306,308 positioned only on one end of the joint pin 302. This facilitates removal of the joint pin 302 from one side of the pin joint assembly 300, which improves serviceability. However, it is contemplated that the retaining elements could be positioned on both sides of the joint pin 302. That is, where the joint pin 302 has channels 304 on both ends thereof that are each associated with a first and second retaining member 306,308, and retainer base 310, for example, where a retainer base 310 is positioned on both first extension 328 and second extension 330 of mount 208, on opposing surfaces thereof.

Also in the embodiments shown in FIGS. 2-6, a single retainer base 310 is provided to engage only one end 320 of retainer 306. It is contemplated that a second retainer base 310, similar or identical to the first, could be positioned opposing retainer base that shown in FIGS. 4,6, the second retainer base 310 positioned to engage first end 318 of retainer 306. However, this may result in added components and cost.

One or more threaded puller holes 344,346 may be provided in connection with the joint pin 302 for attachment of a threaded portion of a puller (not shown) to facilitate removal of the joint pin 302. In one embodiment, as shown, the puller holes 344, 346 may be disposed along longitudinal axis 402. Puller hole 344 may have a smaller diameter than puller hole 346, the larger diameter hole being employed when greater force is needed due to, for example, pin galling. When assembled, first retainer 306 covers puller hole 344 to protect from environmental damage thereto, while a threaded cap 348 is provided for puller hole 346.

INDUSTRIAL APPLICABILITY

The present disclosure provides a pin joint assembly 300 that may be employed between any two structural components to facilitate rotational movement. The pin joint assembly 300 includes a pin and retaining mechanism that improves serviceability of the joint pin 302, and, in particular, allows removal of the joint pin 302 from one side thereof. This may prove beneficial in a wide range of applications, but is particularly useful in connection with the axle suspension assemblies of off-highway haul trucks. In such applications the disclosed pin joint assemblies 300 provide the necessary resistance to axial and rotational forces, but have improved accessibility for removal of the pins for repair or replacement, decreasing machine downtime and operating costs.

Referring to FIGS. 5-6, assembly of an exemplary pivotal connection may be described as follows. The spherical bearing 350 is positioned within a bore 332 of a first end 220 of a linkage 204 that is connected to, for example, a vehicle frame 102. The first end 220 of the linkage 204 is aligned with the bores 316 of the first and second extensions 328, 330 of upper mount 208, and the joint pin 302 positioned within the aligned bores 316, 332 (and associated bearing 350). The ends of the joint pin 302 may be tapered on one or both ends (as shown) to facilitate insertion thereof. During positioning, pin 302 is rotated to align the transverse channel 304 with slot 336 of retainer base 310. So aligned, channel 304 is brought flush with machined surface 326, and the first retainer 306 is fitted within channel 304 and secured with fasteners 314. Alternatively, the first retainer 306 may be attached as the joint pin 302 is inserted which may simplify alignment of the channel 304 with retainer base 310 and machined surface 326. The Second retainer 308 is then positioned over the second end 320 of the first retainer 306, and secured with fasteners 312. Thus assembled, the joint pin 302 is secured against both axial and rotational movement. Grease may be applied to the bearing 350 via port 354, which is in communication with output port 356 disposed central to the pin 302 (FIG. 6).

As shown in FIG. 1, for example, the wheels 106, rims 116, and other components, when assembled, prevent access to the pin joints 206a-d of an axle suspension assembly 202 (such as that shown in FIG. 3) from the exterior of the machine 100. However, all four pin joints 206a-d may be readily accessed from beneath the frame 102 between the four linkages (204a-b on both sides). Once the first and second retaining members 306,308 are removed, a puller (not shown) may be threaded into puller hole 344 to facilitate removal of the joint pin 302. Alternatively, the pins 302 may be removed from the other direction via puller hole 346 after removing the impeding components. This may be particularly beneficial in the event that additional force is required due to excessive galling or damage to the pin joints 206 or surrounding structures.

It should be understood that the above description is intended for illustrative purposes only. While aspects of the particular disclosure have been particularly shown and described with reference to the embodiments above, it will be understood by those skilled in the art that various additional embodiments may be contemplated by modifications of the disclosed machines, systems and methods without departing from the spirit and scope of what is disclosed. Such embodiments should be understood to fall within the scope of the present invention as determined based upon the claims below and any equivalent thereof.

What is claimed is:

1. A pin joint assembly for pivotally connecting at least two components, comprising:
    a joint pin having a first end, a second end, a circumference, a central longitudinal axis, and a channel disposed transverse to and through the longitudinal axis on at least one end of the joint pin;
    a first retainer having a first end and a second end, the first retainer disposed within the channel and removably connected to the joint pin, at least the first end of the first retainer extending beyond the circumference of the joint pin for restricting axial movement of the joint pin in a first direction;
    a second retainer positioned over a portion of the first retainer for restricting axial movement of the joint pin in a second direction;
    a threaded first puller bore being disposed along the central longitudinal axis on a channel bottom surface; and
    a second threaded puller bore disposed on the second end of the joint pin, the second threaded puller bore having a threaded diameter greater than a threaded diameter of the threaded first puller bore.

2. The pin joint assembly of claim 1, further comprising a retainer base, the retainer base having a slot configured to receive the first or second end of the first retainer.

3. The pin joint assembly of claim 2, wherein the second retainer is removably connected to the retainer base, at least a portion of the second retainer being positioned over the slot.

4. The pin joint assembly of claim 3, wherein the retainer base is U-shaped, having a first leg and a second leg defining the slot.

5. The pin joint assembly of claim 4, wherein the second retainer is removably connected to the first and second legs.

6. The pin joint assembly of claim 2, wherein the retainer base is U-shaped, having a first leg and a second leg defining the slot.

7. The pin joint assembly of claim 1, wherein the channel has a rectangular cross-section and the first retainer is a rectangular plate.

8. The pin joint assembly of claim 7, wherein the first retainer includes a plurality of holes that are aligned with a plurality of threaded bores on the bottom surface of the channel, a plurality of bolts connecting the first retainer to the joint pin through the holes and threaded bores.

9. The pin joint assembly of claim 8, wherein the holes and threaded bores are spaced along a transverse axis relative to the longitudinal axis of the joint pin.

10. The pin joint assembly of claim 9, wherein the first retainer covers the threaded first puller bore.

11. The pin joint assembly of claim 1, wherein the first retainer covers the threaded first puller bore.

12. A pin joint assembly comprising:
a first component having a first bore;
a second component having a second bore aligned with the first bore;
a joint pin having a first end, a second end, a circumference, a central longitudinal axis, and a channel disposed transverse to and through the longitudinal axis on the first end of the joint pin, the joint pin being positioned within the bores;
a first retainer having a first end and a second end, the first retainer disposed within the channel and removably connected to the joint pin, at least the first end of the first retainer extending beyond the circumference of the joint pin to engage the first component, restricting axial movement of the joint pin in a first direction, the first retainer including a plurality of holes spaced along a transverse axis, the holes being aligned with a plurality of threaded bores on a bottom surface of the channel, a plurality of bolts connecting the first retainer to the joint pin through the holes and threaded bores;
a second retainer positioned over a portion of the first retainer and connected to the first component, restricting axial movement of the joint pin in a second direction;
a threaded first puller bore being disposed along the central longitudinal axis on the channel bottom surface; and
a second threaded puller bore disposed on the second end of the joint pin, the second threaded puller bore having a threaded diameter greater than a threaded diameter of the threaded first puller bore.

13. The pin joint assembly of claim 12, further comprising a retainer base connected to the first component, the retainer base having a slot configured to receive the first or second end of the first retainer.

14. The pin joint assembly of claim 13, wherein the second retainer is removably connected to the retainer base, at least a portion of the second retainer being positioned over the slot.

15. The pin joint assembly of claim 14, wherein the retainer base is U-shaped, having a first leg and a second leg defining the slot.

16. The pin joint assembly of claim 15, wherein the second retainer is removably connected to the first and second legs.

17. The pin joint assembly of claim 13, wherein the retainer base is U-shaped, having a first leg and a second leg defining the slot.

18. A joint pin for connecting two or more components of an axle assembly comprising:
an outer cylindrical surface, a central longitudinal axis, and a transverse axis;
a first end having a first flat surface;
a second end having a second flat surface and a tapered circumferential edge;
a rectangular channel disposed along the transverse axis on the first end and through the longitudinal axis, the channel defined by a first wall, second wall, and channel bottom surface;
a plurality of threaded bores spaced along the transverse axis on the channel bottom surface, the threaded bores having a first diameter;
a threaded first puller bore having a diameter larger than the first diameter, the first puller bore being disposed along the central longitudinal axis on the channel bottom surface;
a second threaded puller bore disposed on the second end of the joint pin, the second threaded puller bore having a threaded diameter greater than a threaded diameter of the threaded first puller bore.

19. The joint pin of claim 18, further including a first port on the first end of the joint pin fluidly connected to a second port disposed on the cylindrical surface.

20. An axle suspension system comprising: a frame;
an axle assembly;
a plurality of linkage bars having a first and a second end, the first end pivotally connected to the axle assembly, the second end pivotally connected to the frame, each pivotal connection having a pin joint assembly comprising:
a joint pin having a first end, a second end, a circumference, a central longitudinal axis, and a channel disposed transverse to and through the longitudinal axis on at least one end of the joint pin;
a first retainer having a first end and a second end, the first retainer disposed within the channel and removably connected to the joint pin, at least the first end of the first retainer extending beyond the circumference of the joint pin for restricting axial movement of the joint pin in a first direction, the first retainer including a plurality of holes spaced along a transverse axis, the holes being aligned with a plurality of threaded bores on a bottom surface of the channel, a plurality of bolts connecting the first retainer to the joint pin through the holes and threaded bores;
a second retainer positioned over a portion of the first retainer for restricting axial movement of the joint pin in a second direction,
a retainer base, the retainer base having a slot configured to receive the first or second end of the first retainer,
a threaded first puller bore being disposed along the central longitudinal axis on the channel bottom surface;
a second threaded puller bore disposed on the second end of the joint pin, the second threaded puller bore having a threaded diameter greater than a threaded diameter of the threaded first puller bore.

21. The pin joint assembly of claim 20, wherein the retainer base is U-shaped, having a first leg and a second leg defining the slot, the second retainer being removably connected to the retainer base, at least a portion of the second retainer being positioned over the slot.

* * * * *